(12) United States Patent
Wang

(10) Patent No.: US 11,263,684 B2
(45) Date of Patent: Mar. 1, 2022

(54) PRODUCT RECOMMENDATION METHOD AND PRODUCT RECOMMENDATION DEVICE

(71) Applicant: BOE Technology Group Co., Ltd., Beijing (CN)

(72) Inventor: Xiaohong Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 263 days.

(21) Appl. No.: 16/167,100

(22) Filed: Oct. 22, 2018

(65) Prior Publication Data

US 2019/0303997 A1 Oct. 3, 2019

(30) Foreign Application Priority Data

Mar. 29, 2018 (CN) .......................... 201810273476.0

(51) Int. Cl.
| | | |
|---|---|---|
| *G06Q 30/06* | (2012.01) | |
| *G01C 21/34* | (2006.01) | |
| *G06K 9/00* | (2022.01) | |
| *B62B 5/08* | (2006.01) | |

(52) U.S. Cl.
CPC ..... *G06Q 30/0631* (2013.01); *G01C 21/3407* (2013.01); *G06K 9/00369* (2013.01); *B62B 5/082* (2013.01)

(58) Field of Classification Search
CPC ............. G06Q 30/0601–0643; G06Q 60/0631
USPC ................................................ 705/26.1–27.2
See application file for complete search history.

(56) References Cited

U.S. PATENT DOCUMENTS

| | | | | |
|---|---|---|---|---|
| 9,984,130 | B2 * | 5/2018 | Xu ..................... | G06F 16/24578 |
| 10,339,515 | B1 * | 7/2019 | Johnson ................ | B62B 3/1444 |
| 10,861,265 | B1 * | 12/2020 | Merkley ............ | G06K 9/00771 |
| 2008/0226129 | A1 * | 9/2008 | Kundu ............. | G08B 13/19673 |
| | | | | 382/103 |
| 2008/0237339 | A1 * | 10/2008 | Stawar ................. | B62B 3/1408 |
| | | | | 235/383 |
| 2008/0249859 | A1 * | 10/2008 | Angell ................... | G06Q 30/02 |
| | | | | 705/14.39 |

(Continued)

FOREIGN PATENT DOCUMENTS

| | | |
|---|---|---|
| CN | 101454793 A | 6/2009 |
| CN | 101572043 A | 11/2009 |

(Continued)

OTHER PUBLICATIONS

Claus Ebster, Udo Wagner, Deniese Neumueller. Children's influences on in-store purchases. Journal of Retailing and Consumer Services. vol. 16, Issue 2, 2009, pp. 145-154.*

(Continued)

*Primary Examiner* — Alexis M Casey
(74) *Attorney, Agent, or Firm* — McDermott Will & Emery LLP

(57) ABSTRACT

The present disclosure discloses a product recommendation method and a product recommendation device. The product recommendation method includes: detecting whether a sensor arranged on a shopping cart is triggered; determining whether there is a baby in the shopping cart in response to the sensor being triggered; and recommending products related to babies to a user in response to determining that there is a baby in the shopping cart.

12 Claims, 3 Drawing Sheets

(56) References Cited

U.S. PATENT DOCUMENTS

| | | | | |
|---|---|---|---|---|
| 2009/0106085 A1* | 4/2009 | Raimbeault | ........ | G06Q 30/0245 |
| | | | | 705/14.44 |
| 2009/0182630 A1* | 7/2009 | Otto | ...................... | G06Q 20/20 |
| | | | | 705/14.1 |
| 2009/0192874 A1 | 7/2009 | Powles et al. | | |
| 2010/0253504 A1* | 10/2010 | Lliteras | .................. | G08B 21/22 |
| | | | | 340/539.11 |
| 2012/0310744 A1* | 12/2012 | Kim | ...................... | G06Q 30/02 |
| | | | | 705/14.65 |
| 2015/0206121 A1* | 7/2015 | Joseph | ............... | G06Q 30/0633 |
| | | | | 705/23 |
| 2017/0178218 A1* | 6/2017 | Feris | .................. | G06Q 30/0631 |

FOREIGN PATENT DOCUMENTS

| | | |
|---|---|---|
| CN | 102306364 A | 1/2012 |
| CN | 107221098 A | 9/2017 |
| CN | 206910260 U | 1/2018 |

OTHER PUBLICATIONS

Office Action issued in corresponding Chinese Patent Application No. 201810273476.0, dated Mar. 1, 2021.

\* cited by examiner

PRODUCT RECOMMENDATION METHOD AND PRODUCT RECOMMENDATION DEVICE

CROSS-REFERENCE TO RELATED APPLICATION(S)

This application claims priority to Chinese Application No. 201810273476.0, entitled "PRODUCT RECOMMENDATION METHOD AND DEVICE AND ELECTRONIC DEVICE" and filed on Mar. 29, 2018, which is incorporated herein by reference in its entirety.

TECHNICAL FIELD

The present disclosure relates to the field of smart shopping, and in particular to a product recommendation method and a product recommendation device.

BACKGROUND

The emergence of a smart shopping cart makes shopping more intelligent and user-friendly. For example, for convenience of the shopping of parents who carry babies, a shopping cart is usually equipped with a seat or space for the user to place the baby. The user who carries a baby usually has a stronger purchasing demand for baby products, and may hope to complete the purchase as soon as possible. The current smart shopping cart is generally equipped with a display for displaying relevant product information.

SUMMARY

The present disclosure provides a product recommendation method, including: detecting whether a sensor arranged on a shopping cart is triggered; determining whether there is a baby in the shopping cart in response to the sensor being triggered; and recommending products related to babies to a user in response to determining that there is a baby in the shopping cart.

According to an embodiment of the present disclosure, said determining whether there is a baby in the shopping cart includes: enabling a camera device for capturing an image; inputting the captured image to a baby recognition model; and determining whether there is a baby in the shopping cart based on an image recognition result output from the baby recognition model.

According to an embodiment of the present disclosure, said recommending the products related to babies to the user further includes: providing to the user an instruction of whether to initiate a recommendation; and providing the user with the products related to babies in response to receiving an input of initiating the recommendation from the user.

According to an embodiment of the present disclosure, the product recommendation method further includes: receiving an instruction of selecting a target product from the user; and initiating a navigation service for the target product to guide the user to find the target product.

According to an embodiment of the present disclosure, said initiating the navigation service for the target product further includes: detecting location information of the target product and current location information of the shopping cart; calculating a navigation route based on the location information of the target product and the location information of the shopping cart, and providing a navigation prompt to the user according to the navigation route; and updating the location information of the shopping cart and the corresponding navigation route in real time based on movement of the shopping cart, until the shopping cart is guided to the location of the target product.

According to an embodiment of the present disclosure, the product recommendation method further includes: detecting the current location information of the shopping cart; determining whether the location information is within an area of a preset product; and providing the user with prompt information on the preset product, in response to determining that the location information is within the area of a preset product.

The present disclosure further provides a product recommendation device, including: a shopping cart; a sensor arranged on the shopping cart; a camera device arranged on the shopping cart; a positioning device arranged on the shopping cart for detecting position information of the shopping cart; a display arranged on the shopping cart; a memory for storing instructions and a baby recognition model; and a processor connecting to the sensor, the camera device, the positing device, the display and the memory, for executing the instructions stored in the memory to: detect whether the sensor is triggered; determine send an enablement instruction to enable the camera device to capture an image of the shopping cart in response to the sensor being triggered; input the image captured by the camera device to the baby recognition model to determine whether there is a baby in the shopping cart; and display products related to babies on the display in response to determining that there is a baby in the shopping cart.

According to an embodiment of the present disclosure, the sensor comprises one or more of a gravity sensor, an infrared sensor, and a temperature sensor.

According to an embodiment of the present disclosure, the shopping cart is provided with a baby seat, and the sensor is arranged on the baby seat.

According to an embodiment of the present disclosure, the processor further executes the instructions to: display an instruction of whether to initiate a recommendation on the display; and display the products related to babies on the display in response to receiving an input of initiating the recommendation from the user.

According to an embodiment of the present disclosure, the processor further executes the instructions to: receive an instruction of selecting a target product from the user via the display; initiate a navigation service for the target product to guide the user to find the target product.

According to an embodiment of the present disclosure, the processor further executes the instructions to: detect location information of the target product; enable the positioning device to detect current location information of the shopping cart; calculate a navigation route based on the location information of the target product and the location information of the shopping cart, and providing a navigation prompt to the user on the display according to the navigation route; and update the location information of the shopping cart and the corresponding navigation route in real time based on movement of the shopping cart, until the shopping cart is guided to the location of the target product.

According to an embodiment of the present disclosure, the processor further executes the instructions to: enable the positioning device to detect the current location information of the shopping cart; determine whether the location information is within an area of a preset product; and display prompt information on the preset product on the display in response to determining that the location information is within the area of a preset product.

According to an embodiment of the present disclosure, the processor is located remotely from the shopping cart.

DETAILED DESCRIPTION

In order to make the objects, technical solutions and advantages of the present disclosure much clearer, the present disclosure will be further described in detail below with reference to the specific embodiments and the drawings.

It should be noted that all expressions using "first" and "second" in the embodiments of the present disclosure are used to distinguish two non-identical entities or non-identical parameters with the same name. Thus, it is obvious that the words "first" and "second" are only used for convenience of description, but should not be construed as limiting the embodiments of the present disclosure, which will not be explained in the subsequent embodiments again.

In a process of implementing the present disclosure, the inventors have found that there is no effective smart shopping scheme which recommends products based on user's demand currently, especially for users with special needs such as carrying babies, and these users would not have a better shopping experience.

The present disclosure focuses on a group of special users, especially the users carrying babies. On one hand, these users carrying babies usually want to complete their shopping quickly, and on the other hand, these users have great shopping needs for baby products. Therefore, the present disclosure proposes a scheme of recommending baby products for a user according to whether the user uses a baby seat or carries a baby and subsequently achieving a positioning navigation for a target product based on a selection of the user. This will save a shopping time of the user who carries a baby and at the same time achieve accurate marketing of baby products for the businesses. Reference may be made to the following embodiments for details.

Figure 1A:
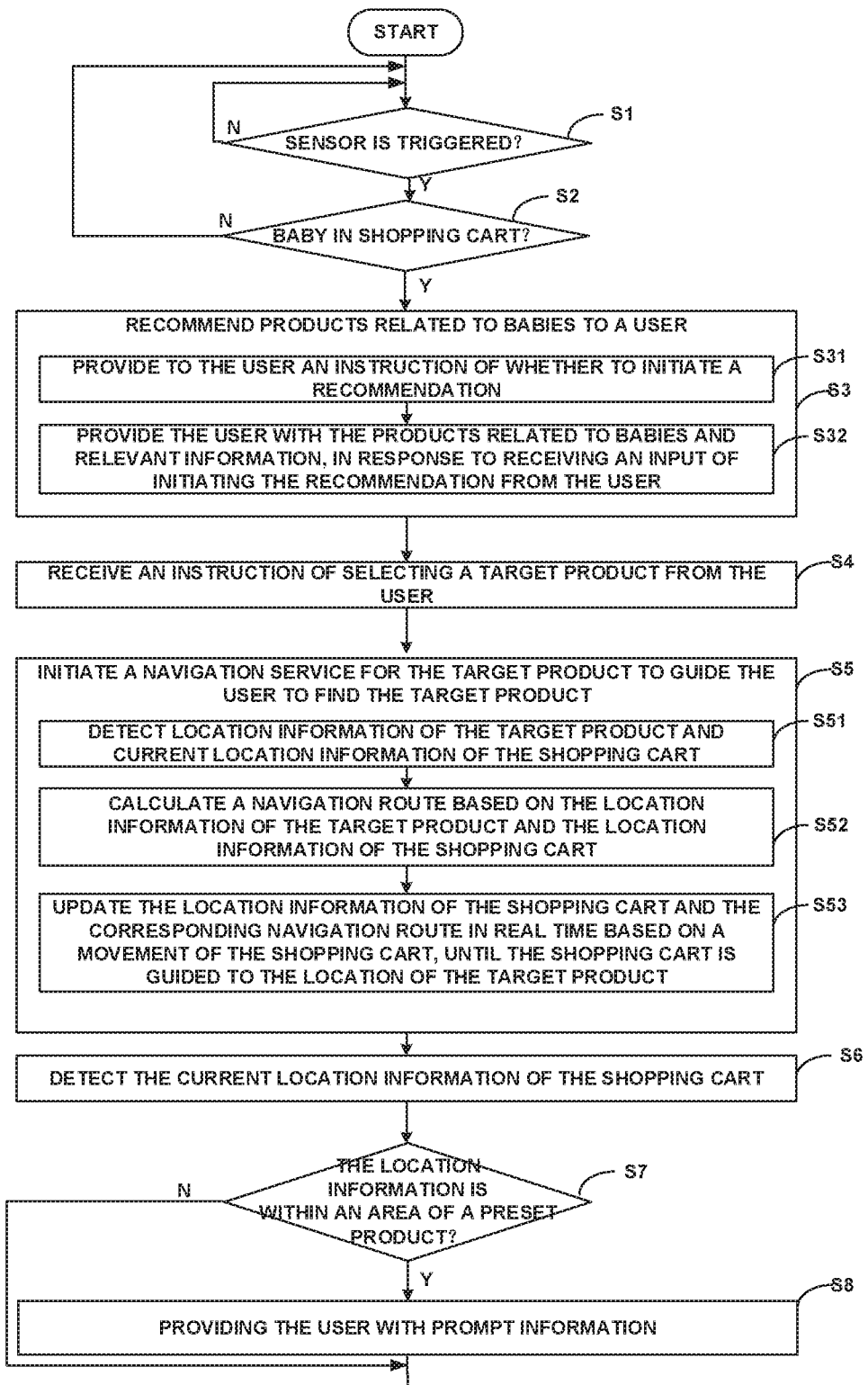
FIG. 1A shows a flowchart of a product recommendation method according to an embodiment of the present disclosure.

FIG. 1A shows a flowchart of a product recommendation method according to an embodiment of the present disclosure. As can be seen from FIG. 1A, a product recommendation method according to an embodiment of the present disclosure includes the following steps.

In step S1, it is detected whether a sensor on a shopping cart is triggered; wherein the sensor includes one or more of a gravity sensor, an infrared sensor, and a temperature sensor. That is, a sensing method, such as gravity sensing, infrared sensing or temperature sensing, may be used on the shopping cart to detect if something like a baby is placed in the shopping cart. Of course, a determination on the triggering may also be made by using a plurality of the sensing methods in combination. In addition, it should be noted that the present disclosure mainly aims at such a place as a physical supermarket or a shopping mall, wherein a structure or a type of the shopping cart is not specifically limited, which may be a large shopping cart commonly used in the supermarkets or a small shopping basket with pulleys, and so on.

According to an embodiment of the present disclosure, the sensor is further provided with a sense triggering parameter range, and the sensor is considered to be triggered only if a sensed value detected by the sensor falls within the sense triggering parameter range. For example, it is assumed that a gravity sensing range of the gravity sensor is from 3 kg to 20 kg. The gravity sensor is considered to be triggered only if a gravity detected by the gravity sensor falls within the range of 3 kg-20 kg.

According to an embodiment of the present disclosure, the shopping cart is provided with a baby seat, and the sensor is arranged on the baby seat. The baby seat is used as a seat or space for placing a baby, so that the user may settle the baby appropriately. The sensor is placed in a proper position on the baby seat so that the sensor may be triggered after the baby is placed in the baby seat. According to an embodiment of the present disclosure, a plurality of sensors may also be provided as required to achieve a better trigger detection effect. For example, a gravity sensor and a temperature sensor may be provided, and the sensors are considered to be triggered only if the gravity detected by the gravity sensor falls within the range of 3 kg-20 kg and the temperature sensor detects a temperature of 30-40° C.

In step S2, in response to the sensor being triggered, it is determined whether there is a baby in the shopping cart; if the sensor is not triggered, a silent state is maintained, i.e., returning back to step S1 to continue the detection and the determination. According to an embodiment of the present disclosure, the further determination of whether there is a baby in the shopping cart after the sensor is triggered not only has a higher accuracy rate, but also avoids a false trigger caused by heavy objects carried or items purchased by the user being placed in the shopping cart. It may reduce power consumption because it does not perform further operations when the sensor is not triggered.

Figure 1B:
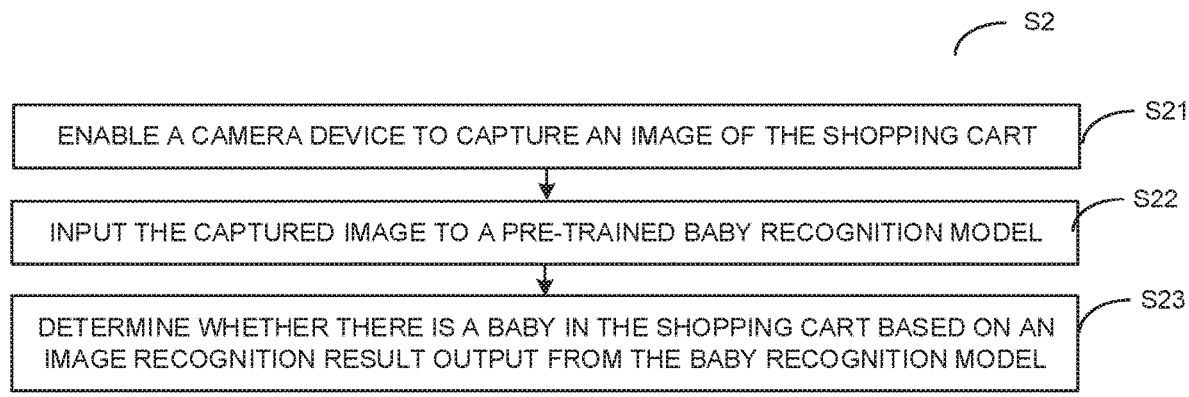
FIG. 1B shows a schematic diagram of a process of a method of determining whether there is a baby in a shopping cart according to an embodiment of the present disclosure.

FIG. 1B shows a schematic diagram of a process of a method of determining whether there is a baby in a shopping cart according to an embodiment of the present disclosure.

As shown in FIG. 1B, in some embodiments of the present disclosure, the step S2 of determining whether there is a baby in the shopping cart may include the following steps.

In step S21, a camera device is enabled to capture an image of the shopping cart. The image of the shopping cart to be captured may be an image of a part of the shopping cart, for example, the image of the baby seat.

In step S22, the captured image is input to a baby recognition model; wherein the baby recognition model is an image recognition model based on a neural network, or may be a recognition model constructed based on other mathematical models. For example, model training is performed by collecting a large number of images in the shopping mall in advance, and then verification is performed by an image for which it is known whether or not there is a baby, thereby improving the accuracy of the baby recognition model.

In step S23, it is determined whether there is a baby in the shopping cart based on an image recognition result output from the baby recognition model.

Further, the camera device may be a camera device arranged in the shopping cart. The camera device is placed in a suitable position in the shopping cart, so that when the sensor on the shopping cart is triggered, the camera device may capture an image of an item within the shopping cart. The camera device may also be a movable camera arranged in a shopping place. When the sensor on the shopping cart is triggered, a central control system of the shopping place detects current location information of the shopping cart by positioning the current shopping cart, controls a camera in the shopping place corresponding to the location of the shopping cart to rotate and capture the item in the shopping cart, so as to avoid installing a camera for each shopping cart and meanwhile to avoid too much interference due to a too close capturing distance, and also to avoid an unclear image being captured due to a too far capturing distance.

In step S3, if there is a baby in the shopping cart, products which are preset to be related to babies are recommended to the user. If it is determined that there is no baby in the shopping cart, the process may return to step S1 to continue the detection and the determination, or may recommend relevant preferential information to the user. The products related to babies may be baby products, especially related currently hot products, seasonal products or promotional products.

According to an embodiment of the present disclosure, the further determination of whether there is a baby in the shopping cart is made by the camera device capturing the image after the sensor is triggered, which not only has a higher accuracy of identification, but also keeps the camera device off or in a standby state when the sensor is not triggered, thereby reducing the power consumption.

According to an embodiment of the present disclosure, the step S3 of recommending the products related to babies to the user further includes the following steps.

In step S31, an instruction of whether to initiate a recommendation is provided to the user. For example, a dialog box regarding whether to recommend baby products is popped up on a display of the shopping cart for the user to select. If the user does not need to purchase these baby products currently, he/she may cancel the recommendation; if the user has a purchase demand for baby products, he/she may accept the recommendation. Of course, whether to initiate the recommendation here may also be implemented in other ways, for example, by means of voice broadcast, and in such a case the user may select by voice, which are not particularly limited in the present disclosure.

In step S32, in response to receiving an input of initiating the recommendation from the user, the products related to babies and relevant information are displayed to the user. For example, the products related to babies and relevant information are displayed on a display arranged on the shopping cart. For another example, the user may be provided with the products related to babies and relevant information by voice. If the user selects to accept the recommendation instruction, it means that the user has a corresponding purchase demand, so it is necessary to display information of the products related to babies or current preferential information on the display. It should be noted that the present disclosure does not limit the formats and types of the products and relevant information displayed, that is, it may be adjusted accordingly according to actual requirements.

It may be seen from the above embodiments that in the product recommendation method of the present disclosure, the sensor is arranged on the shopping cart and thus the sense triggering is implemented using the sensor, then an image is captured by the camera device for identification and determination, and finally it can be determined accurately whether the current user carries a baby, and thus the products related to babies may be accurately recommended to the current user; meanwhile, the sensor is triggered passively and the camera device is enabled based on the sensor being triggered, which may save the power consumption, reduce the costs and a service life of the device. Therefore, the product recommendation method according to the present disclosure may not only achieve more accurate and effective product recommendation based on the characteristics of the user who carries the baby, but also bring a better shopping experience to the user, and the related device may have a lower power consumption and a longer service life.

In some embodiments of the present disclosure, in order to further improve the shopping efficiency and the shopping experience of the user, the product recommendation method further includes the following steps.

In step S4, an instruction of selecting a target product by the user is received; wherein in step S3, after the products are recommended to the user, the user may select one or more of the products as the target product(s), and then the process proceeds to a subsequent step S5, in which navigation for the user is performed.

In step S5, a navigation service for the target product is initiated to guide the user to find the target product. The navigation service includes a navigation service for a single product and an integrated navigation service for multiple products. For example, when the user selects multiple products, the user may be provided with a route for finding all the products based on the different locations of the multiple products. Further, a navigation route may be set accordingly based on an order in which the user selects the target products.

According to an embodiment of the present disclosure, the step S5 of initiating the navigation service for the target product further includes the following steps.

In step S51, location information of the target product and current location information of the shopping cart are detected; wherein the location information of the target product is known fixed location information, and the detection of the location information of the current shopping cart may be implemented by adding a corresponding sensor or a positioning device (for example, GPS). According to an embodiment of the present disclosure, a positioning device may be arranged on the shopping cart to detect the position of the shopping cart. Any positioning device that can detect a position of a target is applicable in the present disclosure.

In step S52, based on the location information of the target product and the location information of the shopping cart, a navigation route is calculated in combination with the layout in the shopping place, and a navigation prompt is provided to the user according to the navigation route. After determining the location of the shopping cart and the location of the target product, a route algorithm may be utilized to provide a navigation route recommendation, which may include a shortest path recommendation and a shortest time path recommendation. Of course, based on the changes in the layout of some shopping malls, the navigation route may change. At this time, the calculation of the navigation route needs to obtain the latest indoor layout information of the shopping mall and thus realizes the planning of the navigation route. According to an embodiment of the present disclosure, the navigation route may also be determined based on the type of the target product. For example, if the target product selected by the user is a kind of baby food, an area related to the baby food may be taken into account in calculating the navigation route, so as to provide the user with as many baby food products as possible on the navigation route. When the target product selected by the user is a kind of baby toy, an area related to the baby toy may be taken into account in calculating the navigation route, so as to provide the user with as many baby toy products as possible on the navigation route. According to an embodiment of the present disclosure, providing a navigation prompt to the user may include, for example, displaying a path navigation on the display, or providing the user with a next navigation, e.g. by voice announcement.

In step S53, the location information of the shopping cart and the corresponding navigation route are updated in real time based on movement of the shopping cart, until the shopping cart is guided to the location of the target product.

In this way, not only the current location information of the shopping cart may be obtained in real time, but also the route may be adjusted correspondingly according to the surrounding environment, and especially, the user may enter a product purchase area unexpectedly during the purchase of the product. For example, the user finds a product he/she is interested in on the navigation route, and thus he enters another product area without following the navigation route; then the navigation route is updated by updating the location of the shopping cart in real time, so that the user may finally reach the location of the target product by following the navigation route, after he/she completes the shopping in the other product area.

In some other embodiments of the present disclosure, the present disclosure proposes a prompt strategy based on the fact that some products are located in a small area and are easily overlooked, or are located relatively remote. Specifically, the product recommendation method further includes the following steps.

In step S6, the current location information of the shopping cart is detected.

In step S7, it is determined whether the current location information of the shopping cart is within an area of a preset product; wherein the preset product may include a preset product related to babies, a user-selected product, or a preset preferential product; that is, the area of the preset product here may be an area of the preferential product for all users. For example, if the current mall is promoting toothpaste A, the shopping cart will provide corresponding preferential offers when the user pushes the shopping cart near the toothpaste A. Alternatively, the area of the preset product may also be based on the recommendation for the user who carries the baby detected in the above step, e.g., the area of the products related to babies. Alternatively, the area of the preset product may also be based on the area corresponding to the target product selected by the user in the above step S4. For example, after the user selects a target product B, when the user approaches the target product B by navigation, the shopping cart provides a prompt message to prompt the user that his destination has arrived.

In step S8, the user is provided with prompt information on the preset product, in response to determining that the location information is within the area of a preset product. The prompt information may be a voice prompt sent from the shopping cart, or a lighting prompt sent by a device arranged in the area of the preset product. The present embodiment does not make detailed limitations on how to implement the prompt. In this way, the prompt to the user may not only enable the user to find the target product accurately, which improves the shopping efficiency of the user, but also attract the attention of the baby, which improves the shopping experience.

Figure 2:
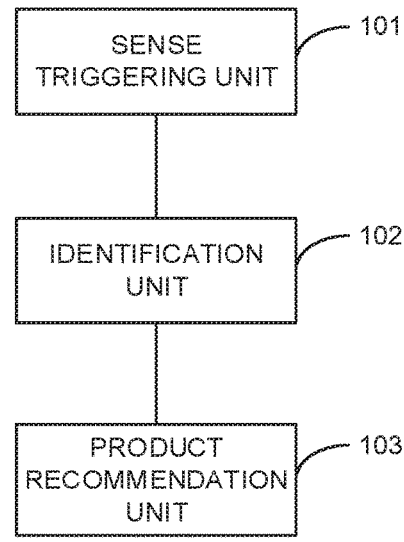
FIG. 2 shows a block diagram of a structure of a product recommendation device according to an embodiment of the present disclosure.

FIG. 2 shows a block diagram of a structure of a product recommendation device according to an embodiment of the present disclosure. As shown in FIG. 2, the product recommendation device may include: a sense triggering unit 101 configured to detect whether a sensor arranged on a shopping cart is triggered; and transmit a trigger instruction to an identification unit 102 in response to the sensor being triggered; wherein the sensing triggering unit 101 may be a unit connected to the sensor, or a unit containing the sensor; the identification unit 102 configured to determine whether there is a baby in the shopping cart after the trigger instruction transmitted by the sense triggering unit 101 is received; and transmitting a recommendation instruction to a product recommendation unit 103 in response to determining that there is a baby in the shopping cart; and the product recommendation unit 103 configured to receive the recommendation instruction transmitted by the identification unit 102, and recommend products related to babies to the user.

In some embodiments of the present disclosure, the sensor includes one or more of a gravity sensor, an infrared sensor, and a temperature sensor.

In some embodiments of the present disclosure, the shopping cart is provided with a baby seat, the sensor being arranged on the baby seat.

In some embodiments of the present disclosure, the identification unit 102 is further configured to: enable a camera device to capture an image of the shopping cart; input the captured image to a baby recognition model; and determine whether there is a baby in the shopping cart based on an image recognition result output from the baby recognition model.

In some embodiments of the present disclosure, the product recommendation unit 103 is further configured to: provide to the user an instruction of whether to initiate a recommendation; and provide the user with the products related to babies and relevant information, in response to receiving an input of initiating the recommendation from the user.

In some embodiments of the present disclosure, the product recommendation unit 103 is further configured to: receive an instruction of selecting a target product from the user; and initiate a navigation service for the target product to guide the user to find the target product.

In some embodiments of the present disclosure, the product recommendation unit 103 is further configured to: detect location information of the target product and current location information of the shopping cart; calculate a navigation route based on the location information of the target product and the location information of the shopping cart, and providing a navigation prompt to the user according to the navigation route; and update the location information of the shopping cart and the corresponding navigation route in real time based on movement of the shopping cart, until the shopping cart is guided to the location of the target product.

In some embodiments of the present disclosure, the product recommendation unit 103 is further configured to: detect the current location information of the shopping cart; determine whether the location information is within an area of a preset product; and provide the user with prompt information on the preset product in response to determining that the location information is within the area of a preset product.

It should be noted that the product recommendation device has the same features as those of the product recommendation method as described in the above embodiment, and thus has the same technical effects, which will not be repeatedly described in the present embodiment.

Figure 3:
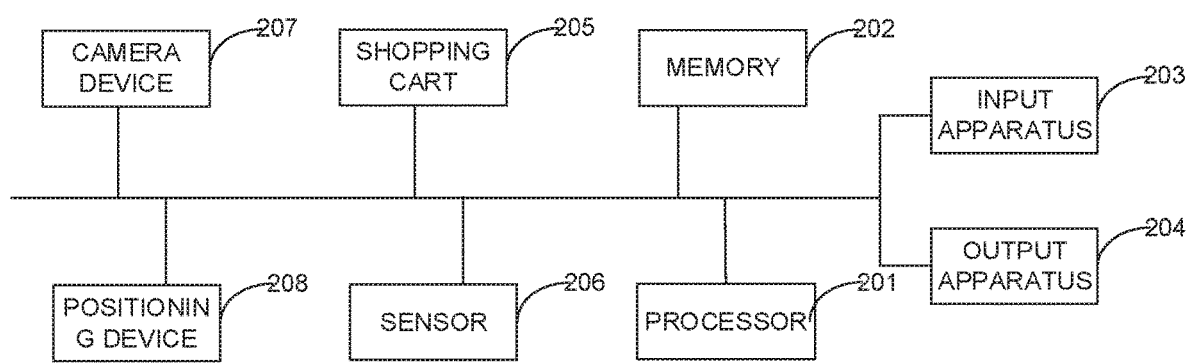
FIG. 3 shows a hardware structure diagram of a product recommendation device according to an embodiment of the present disclosure.

FIG. 3 shows a hardware structure diagram of a product recommendation device according to an embodiment of the present disclosure. The product recommendation device includes: at least one processor 201, a memory 202, a shopping cart 205, a sensor 206, a camera device 207 and a positioning device 208. In FIG. 3, one processor 201 is illustrated as an example.

The sensor 206, the camera device 207 and the positioning device 208 are arranged on the shopping cart 205.

The product recommendation device may further include: an input apparatus 203 and an output apparatus 204.

The processor 201, the memory 202, the input apparatus 203, the output apparatus 204, the shopping cart 205, the sensor 206, the camera device 207 and the positioning device 208 may be connected by a bus or other means. FIG. 3 shows a connection by a bus as an example.

The memory 202, as a non-volatile computer readable storage medium, may be used for storing non-volatile software programs, non-volatile computer-executable programs, and modules, such as program instructions/modules corresponding to the product recommendation method in the embodiment of the present disclosure and the baby recognition model. The processor 201 executes various functional applications and data processing, i.e., implementing the product recommendation method according to the above method embodiments, by executing non-volatile software programs, instructions, and modules stored in the memory 202.

The memory 202 may include a storage program area and a storage data area, wherein the storage program area may store an operating system, an application required by at least one function; the storage data area may store data created according to the use of the product recommendation device, the baby recognition model and the like. Moreover, the memory 202 may include a high speed random access memory, and may also include a non-volatile memory, such as at least one magnetic disk storage device, flash memory device, or other non-volatile solid state storage device. In some embodiments, the memory 202 may alternatively include memories remotely located relative to the processor 201, which may be coupled to the processor over a network. Examples of such a network include, but are not limited to, the Internet, Intranets, local area networks, mobile communication networks, and combinations thereof.

The input apparatus 203 may include devices, such as a touch screen, a microphone, and the like. The output apparatus 204 may include a display, a speaker, and the like. The input apparatus 203 and the output apparatus 204 may further include one or more antenna units for receiving an input from outside or outputting to the outside. According to an embodiment of the present disclosure, the input apparatus 203 and the output apparatus 204 may also include an interface to a wired line for receiving an input and/or providing an output via the wired line.

The one or more modules are stored in the memory 202, and perform the product recommendation method in any of the above method embodiments when being executed on the one or more processors 201.

According to an embodiment of the present disclosure, the processor 201 may execute the instructions stored in the memory 202 to detect whether the sensor 206 is triggered; send an enablement instruction to enable the camera device 207 to capture an image of the shopping cart in response to the sensor 206 being triggered; input the image captured by the camera device 207 to the baby recognition model to determine whether there is a baby in the shopping cart 205; and display the products related to babies on the display 204 in response to determining that there is a baby in the shopping cart 205.

According to an embodiment of the present disclosure, the sensor 206 may include one or more of a gravity sensor, an infrared sensor, and a temperature sensor.

According to an embodiment of the present disclosure, the shopping cart 205 is provided with a baby seat, and the sensor 206 is arranged on the baby seat.

According to an embodiment of the present disclosure, the processor 201 also executes the instructions stored in the memory 202 to: display on the display 204 an instruction of whether to initiate a recommendation; and display on the display 204 the products related to babies and relevant information in response to receiving an input of initiating the recommendation from the user.

According to an embodiment of the present disclosure, the processor 201 also executes the instructions stored in the memory 202 to: receive an instruction of selecting a target product from the user on the display 204; and initiate a navigation service for the target product to guide the user to find the target product.

According to an embodiment of the present disclosure, the processor 201 also executes the instructions stored in the memory 202 to: detect location information of the target product; enable the positioning device 208 to detect current location information of the shopping cart; calculate a navigation route based on the location information of the target product and the location information of the shopping cart, and providing on the display 204 a navigation prompt to the user according to the navigation route; and update the location information of the shopping cart and the corresponding navigation route in real time based on movement of the shopping cart, until the shopping cart is guided to the location of the target product.

According to an embodiment of the present disclosure, the processor 201 also executes the instructions stored in the memory 202 to: enable the positioning device 208 to detect the current location information of the shopping cart; determine whether the location information is within an area of a preset product; and display on the display 204 prompt information on the preset product, in response to determining that the location information is within the area of a preset product.

According to an embodiment of the present disclosure, the processor 201, the memory 202, the input apparatus 203, the output apparatus 204, the sensor 204, the camera device 207 and the positioning device 208 may all be located on the shopping cart 205.

According to yet another embodiment of the present disclosure, the processor 201 may be located remotely from the shopping cart 205. For example, the processor 201 may be located in a central control system of the shopping place. For example, when the sensor on the shopping cart is triggered, the shopping cart (particularly, the processor 201) provides an indication signal to the central control system via the output apparatus 204. When receiving the indication signal, the central control system may control a camera device in the shopping place or the camera device equipped on the shopping cart to capture the image, and input the captured image to the baby recognition model (stored in the central control system in this case), in order to determine whether there is a baby in the shopping cart according to the image recognition result output from the baby recognition model. In response to determining that there is a baby in the shopping cart, the central control system may provide the products related to babies to the shopping cart e.g. via the input apparatus 203 of the shopping cart, so as to display the products related to babies on e.g., the display of the shopping cart.

The product recommendation device provided by the embodiment of the present disclosure has functional modules and beneficial effects corresponding to the method. For technical details that are not described in detail in the present embodiment, reference may be made to the methods provided by the embodiments of the present disclosure.

It should be understood by the skilled in the art that the discussion of any of the above embodiments is merely exemplary and is not intended to suggest that the scope of the present disclosure (including the claims) is limited to these examples; under the principle of the present disclosure, the technical features in the above embodiments or different embodiments may also be combined, the steps may be carried out in any order, and there may be many other variations of various aspects of the present disclosure as described above, which are not provided in detail for the sake of brevity.

In addition, well-known power supply/ground connections to integrated circuit (IC) chips and other components may or may not be shown in the provided drawings for simplicity of illustration and discussion, and for not obscuring the present disclosure. Furthermore, the apparatuses may be shown in a block diagram form in order to avoid obscuring the present disclosure, and this also contemplates the fact that the details of the embodiments of the apparatuses in the block diagrams are highly dependent on the platform on which the present disclosure is to be implemented (i.e., the details should be well understood by the skilled in the art). In the case where the specific details (e.g., circuits) are described to explain the exemplary embodiments of the present disclosure, it will be apparent to the skilled in the art that the present disclosure may be implemented without the details or with variations of the details. Accordingly, the description should be considered as illustrative but not restrictive.

Although the present disclosure has been described in connection with the particular embodiments of the present disclosure, many alternatives, modifications and variations of these embodiments are apparent to the skilled in the art. For example, other memory architectures (e.g., dynamic RAM (DRAM)) may use the embodiments as discussed.

All such alternatives, modifications, and variations are intended to be included within the scope of the appended claims. Therefore, any omissions, modifications, equivalents, improvements, etc., which are made within the spirit and scope of the present disclosure are intended to be included within the scope of the present disclosure.

I claim:

1. A product recommendation method for recommending products related to babies, comprising:
   determining, by a processor, there is a baby in the shopping cart; and
   recommending, by the processor, products related to babies to a user in response to determining that there is a baby in the shopping cart,
   wherein determining, by the processor, there is a baby in the shopping cart comprises:
   roughly determining there is a baby in the shopping cart by detecting a sensor arranged on a baby seat which is provided on a shopping cart is triggered; and
   accurately determining, in response to roughly determining there is a baby in the shopping cart, there is a baby in the shopping cart by:
   enabling a camera device for capturing an image;
   inputting a captured image to a baby recognition model; and
   determining there is a baby in the shopping cart based on an image recognition result output from the baby recognition model.

2. The product recommendation method of claim 1, wherein said recommending, by the processor, the products related to babies to the user further comprises:
   providing, by the processor, to the user an instruction of whether to initiate a recommendation; and
   providing, by the processor, the user with the products related to babies in response to receiving an input of initiating the recommendation from the user.

3. The product recommendation method of claim 2, further comprising:
   receiving, by the processor, an instruction of selecting a target product from the user; and
   initiating, by the processor, a navigation service for the target product to guide the user to find the target product.

4. The product recommendation method of claim 3, wherein said initiating, by the processor, the navigation service for the target product further comprises:
   detecting, by the processor, location information of the target product and current location information of the shopping cart;
   calculating, by the processor, a navigation route based on the location information of the target product and the location information of the shopping cart, and providing a navigation prompt to the user according to the navigation route; and
   updating, by the processor, the location information of the shopping cart and the corresponding navigation route in real time based on movement of the shopping cart, until the shopping cart is guided to the location of the target product.

5. The product recommendation method of claim 2, further comprising:
   detecting, by the processor, the current location information of the shopping cart;
   determining, by the processor, whether the location information is within an area of a preset product; and
   providing, by the processor, the user with prompt information on the preset product, in response to determining that the location information is within the area of a preset product.

6. A product recommendation device, comprising:
   a shopping cart having a baby seat;
   a sensor arranged on the baby seat;
   a camera device arranged on the shopping cart;
   a positioning device arranged on the shopping cart for detecting position information of the shopping cart;
   a display arranged on the shopping cart;
   a memory for storing instructions and a baby recognition model; and
   a processor connecting to the sensor, the camera device, the positioning device and the memory, for executing the instructions stored in the memory to:
   determine there is a baby in the shopping cart; and
   display products related to babies on the display in response to determining that there is a baby in the shopping cart,
   wherein the processor executes the instructions to determine there is a baby in the shopping cart by:
   roughly determining there is a baby in the shopping cart by detecting the sensor being triggered; and
   accurately determining, in response to roughly determining there is a baby in the shopping cart, there is a baby in the shopping cart by:

sending an enablement instruction to enable the camera device to capture an image of the shopping cart in response to the sensor being triggered; and inputting the image captured by the camera device to the baby recognition model to determine there is a baby in the shopping cart.

7. The product recommendation device of claim 6, wherein the sensor comprises one or more of a gravity sensor, an infrared sensor, and a temperature sensor.

8. The product recommendation device of claim 6, wherein the processor further executes the instructions to:

display an instruction of whether to initiate a recommendation on the display; and display the products related to babies on the display in response to receiving an input of initiating the recommendation from the user.

9. The product recommendation device of claim 8, wherein the processor further executes the instructions to:

receive an instruction of selecting a target product from the user via the display; and initiate a navigation service for the target product to guide the user to find the target product.

10. The product recommendation device of claim 9, wherein the processor further executes the instructions to:

detect location information of the target product;

enable the positioning device to detect current location information of the shopping cart;

calculate a navigation route based on the location information of the target product and the location information of the shopping cart, and providing a navigation prompt to the user on the display according to the navigation route; and update the location information of the shopping cart and the corresponding navigation route in real time based on movement of the shopping cart, until the shopping cart is guided to the location of the target product.

11. The product recommendation device of claim 8, wherein the processor further executes the instructions to:

enable the positioning device to detect the current location information of the shopping cart;

determine whether the location information is within an area of a preset product; and display prompt information on the preset product on the display in response to determining that the location information is within the area of a preset product.

12. The product recommendation device of claim 6, wherein the processor is located remotely from the shopping cart.

* * * * *